UNITED STATES PATENT OFFICE.

JOHN H. STEVENS, OF NEWARK, NEW JERSEY, ASSIGNOR, BY MESNE ASSIGNMENTS, TO THE CELLULOID COMPANY, OF NEW JERSEY.

MANUFACTURE OF COMPOUNDS OF PYROXYLINE.

SPECIFICATION forming part of Letters Patent No. 478,543, dated July 5, 1892.

Application filed March 24, 1888. Serial No. 268,387. (No specimens.)

*To all whom it may concern:*

Be it known that I, JOHN H. STEVENS, of the city of Newark, county of Essex, and State of New Jersey, have invented certain new and useful Improvements in the Manufacture of Compounds of Pyroxyline or Nitro-Cellulose, of which improvements the following is a specification.

The principal object of my present invention is to provide a new liquid compound of pyroxyline or nitro-cellulose, or a new liquid solvent which may be applied in conjunction with nitro-cellulose in greater or less proportions.

In patents granted to me December 19, 1882, Nos. 269,340, 269,341, 269,343, 269,344, and 269,345, I have described and claimed the use of a large number of menstrua or solvents of nitro-cellulose, many of which may be used in connection with the present invention, as hereinafter stated.

It has long ago been suggested that common benzine or mineral naphtha by reason of its cheapness (and water-repellent properties) is a very desirable ingredient or menstruum in solvents of pyroxyline both when used for making their solutions or for solid materials. It is also well known that wood-alcohol or vegetable naphtha is a very powerful solvent of pyroxyline or nitro-cellulose, and it has long been successfully used in the art of manufacture of pyroxyline compounds. Mineral naphtha will not, however, mix readily with vegetable naphtha, and when equal volumes of the two naphthas are brought together they immediately separate into two layers. To permit the operator in this art to readily unite these two substances, so as to enlarge the list of solvents of pyroxyline, and enable him to produce new effects in his mixtures is the object of my invention.

I have discovered that the two naphthas will immediately and easily unite when brought in contact with (so far as I have ascertained) any volatile liquid which is soluble in alcohol and insoluble in water. Certainly all the volatile liquids which I have successfully used to produce this result are embraced in this classification; but I do not mean to include substances which are feebly soluble in alcohol or which dissolve therein with difficulty—such, for instance, as bisulphide of carbon—but I refer to such substances as are freely soluble, of which the following are good examples: fusel-oil or amyl-alcohol, acetal, amylic ether, nitrate of amyl, or any of the amyl ethers, chloroform, oil of winter-green, oil of cassia, oil of sassafras, ether, salicylate of methyl, and benzoic ether.

It will be readily seen that the greatest variety of effects can be produced by varying the proportions or character of the different ingredients both in making varnish or stiffer compounds of pyroxyline. I do not, therefore, give proportions for all the possible combinations with these new benzine solvents. I have also found that the solvent power of the new threefold solvent is considerably higher than would be expected when it is considered that benzine and many of the substances used to unite it with the wood-alcohol are in no degree solvents of pyroxyline.

In making a solid material I prefer to grind hydrated pyroxyline to a pulp with gum-camphor, remove the water by suitable means, and then add to the compound pulp a sufficient quantity of the following liquid solvent: say three volumes wood-alcohol, two volumes benzine, two volumes of one of the ingredients above referred to, such as fusel-oil, preferring to follow the process patented by I. S. Hyatt and J. W. Hyatt October 27, 1874, and as described by them. If desired, however, the operator can employ my present invention in the manufacture of solid materials by using the liquid solvent without camphor, or in conjunction with camphor dissolved in such liquid solvent or in any other manner.

In making a varnish which will dry to a hard and brilliant film I recommend the following: wood-alcohol, (specific gravity 810°,) thirty-two parts, by weight; fusel-oil, seven parts, by weight; benzine, seven parts, by weight; camphor, two and one-half parts, by weight; pyroxyline, two parts, by weight. The presence of camphor in this varnish enables me to apply it to such purposes as coating pictures or lithographs, where it is desirable to press the picture carrying the dried coating against a heated polished plate or surface to give it a high finish. In other words, the dried film left after largely evaporating the solvents is capable of being molded like celluloid. I do not, however, limit myself to the use of camphor in this or any other of the formulas or directions given.

In addition to the above class of substances which I use to unite benzine and wood-alcohol I have discovered that acetate of methyl is also efficient for this purpose, two volumes of wood-alcohol, (specific gravity 810°,) two volumes of benzine, and one volume of acetate of methyl form a good solvent mixture.

For a liquid solvent of pyroxyline to be used in greater or less proportions I have found that the following ingredients will mix: wood-alcohol, (specific gravity 810°,) twelve volumes, by measure; benzine, twelve volumes; fusel-oil, five volumes; or wood-alcohol, (specific gravity 810°,) twelve volumes; benzine, twelve volumes; ether, three volumes, (of the last two specimens the latter is much the more efficient solvent.)

For a good, clear, dry mixture I have experimented with the following: wood-alcohol, (specific gravity 810°,) twenty-two parts, by weight; fusel oil, six parts; benzine, six parts; camphor, two and one-half parts; pyroxyline, two parts.

I do not limit myself to any exact proportions of the indredients to be used, but desire to claim, broadly, the compound or solution of pyroxyline or solvent of pyroxyline, consisting of wood-alcohol, benzine, and one or more volatile liquids soluble in alcohol but not in water, as my experiments lead me to believe that the valuable properties of benzine in connection with wood-alcohol may be availed of by causing such materials to mix by the use of any one or more of the many volatile liquids of the class of which those specimens above referred to, which are soluble in alcohol but not in water.

What I claim, and desire to secure by Letters Patent, is—

1. A solution of pyroxyline in a menstruum composed of wood-alcohol, benzine, and a volatile liquid soluble in alcohol but not in water, substantially as described.

2. A solvent for pyroxyline, consisting of a mixture of wood-alcohol, benzine, and a volatile liquid soluble in alcohol but not in water, substantially as described.

3. A solvent for or solution of pyroxyline, consisting of a mixture of wood-alcohol, benzine, camphor, and a volatile liquid soluble in alcohol but not in water, substantially as described.

4. A solvent for pyroxline, consisting of a mixture of benzine, wood-alcohol, and acetate of methyl, substantially as described.

JOHN H. STEVENS.

Witnesses:
J. NOTTINGHAM WILLIAMS,
CHAS. G. F. WAHLE, Jr.